E. G. DOLAND.
WAGON BRAKE.
APPLICATION FILED JAN. 10, 1910.
980,076.
Patented Dec. 27, 1910.
2 SHEETS—SHEET 1.
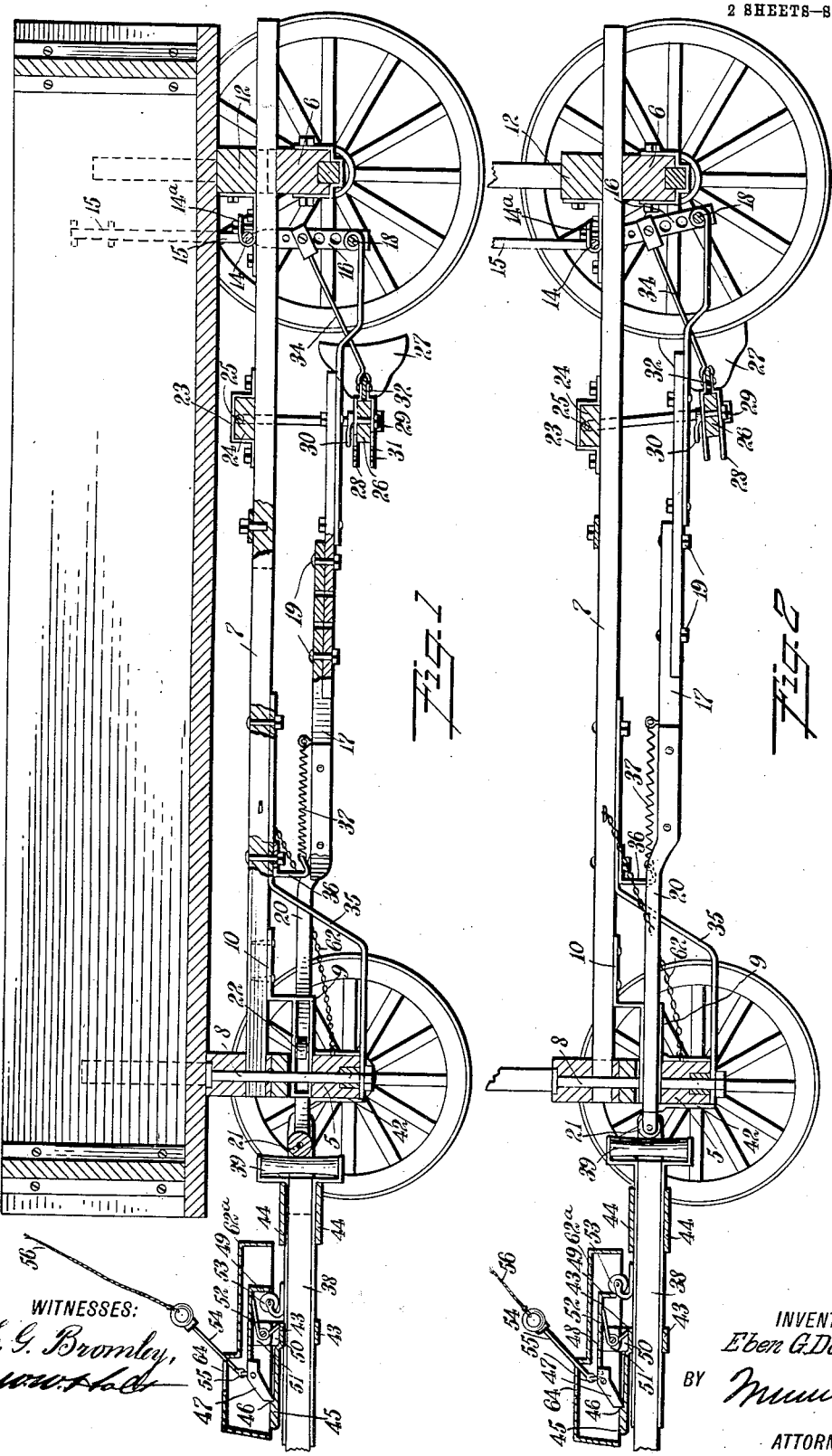
WITNESSES:
INVENTOR
Eben G. Doland
BY
ATTORNEYS

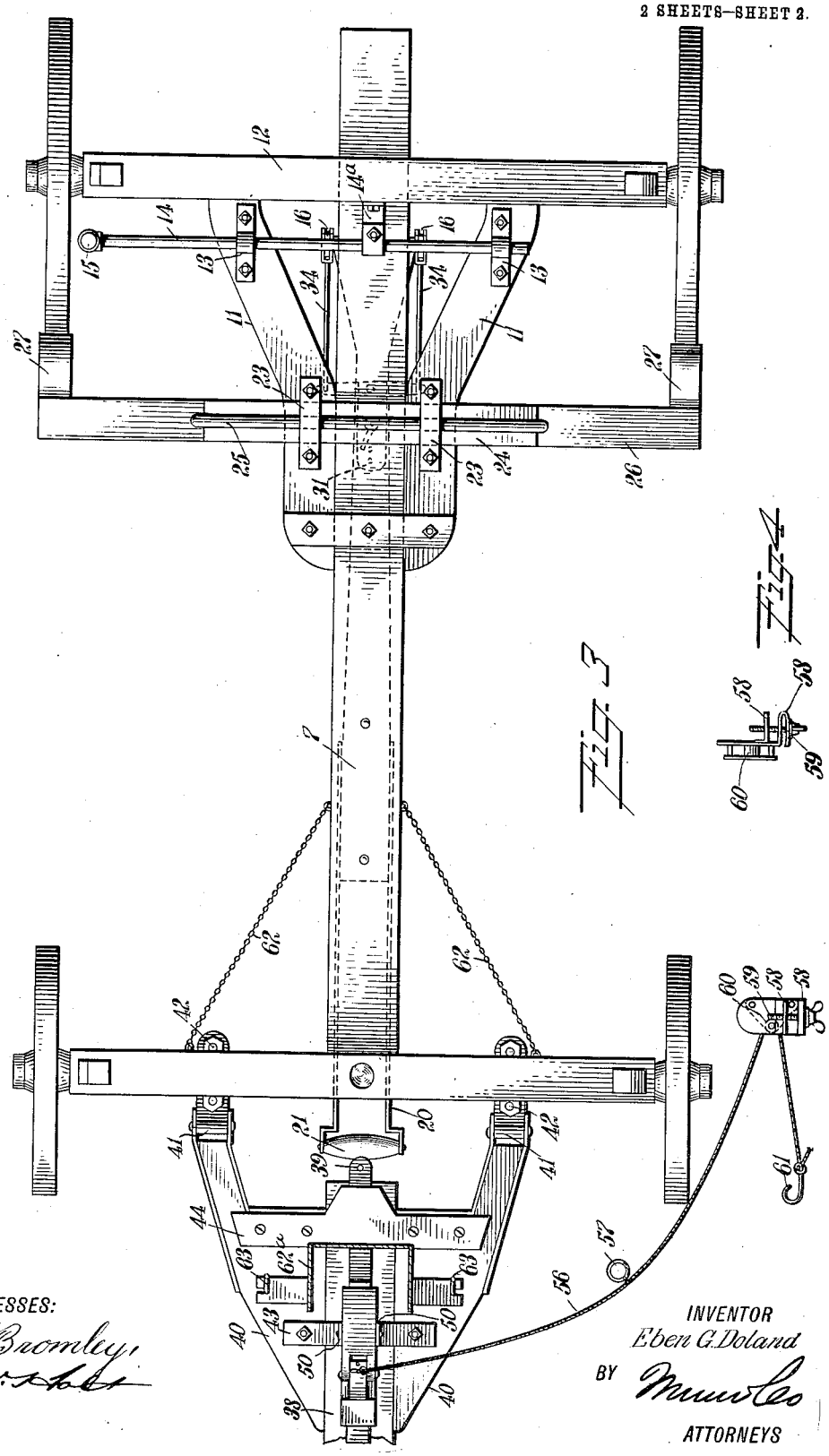

UNITED STATES PATENT OFFICE.

EBEN G. DOLAND, OF STARKSBORO, VERMONT.

WAGON-BRAKE.

980,076.    Specification of Letters Patent.   Patented Dec. 27, 1910.

Application filed January 10, 1910. Serial No. 537,154.

*To all whom it may concern:*

Be it known that I, EBEN G. DOLAND, a citizen of the United States, and a resident of Starksboro, in the county of Addison and State of Vermont, have invented a new and Improved Wagon-Brake, of which the following is a full, clear, and exact description.

The invention is an improvement in wagon and other vehicle brakes, and has in view a brake arrangement to automatically lock with the shoes either applied or released, by a predetermined pull and backing of the wagon tongue respectively, and which is adapted to be manually unlocked and locked, whereby the brakes are freely applied and released under the action of the tongue.

The invention further resides in certain features of construction and arrangement of parts as will be hereinafter described and pointed out in the appended claims.

Reference is to be had to the accompanying drawings forming a part of this specification, in which similar characters of reference indicate corresponding parts in all the views.

Figure 1 is a side elevation of a wagon, partly in central vertical section, having my improved brake applied thereto, and showing the brakes released; Fig. 2 is a similar section of the wagon, showing the brakes applied; Fig. 3 is a plan of the wagon, with the body removed; and Fig. 4 is an edge view of a sheave attachment which is used as a feature in manually controlling the brake-locking-mechanism.

For convenience of illustration I have shown the brake applied to a conventional form of wagon running gear having the front and rear axles 5 and 6 respectively, connected together by the reach-bar 7, through the forward end of which passes the king-pin 8, this pin also passing through the forward portion of a roller casing 9, which has an upwardly offset arm 10 attached to the under side of the reach-bar. Between the rear axle and the reach-bar are provided hounds 11, which are provided at the top adjacent to the rear bolster 12 with bearings 13, in which a brake-shaft 14 is journaled, the brake-shaft being extended to one side of the wagon, where it is provided with an upwardly-extended socket 15 for receiving a hand brake-lever. The bearings 13 are to an extent relieved of strain on the brake shaft by a strap 14ª passing thereabout and secured to the bolster 12. At each side of the reach-bar the brake-shaft has a depending arm 16, and between the lower portions of these arms is adjustably pivotally supported the rear end of a brake reach-bar 17, the adjustment being effected by providing the arms with a number of alining openings through which is adapted to pass a removable pin or bolt 18. The brake reach-bar is constructed of two overlapping sections adjustably connected together by bolts 19, with the forward section having forwardly-extended side-bars 20 slidably supported on the front axle 5, and having a horizontally-arranged roller 21 journaled between them at the front of the axle. In the roller casing 9 a horizontal roller 22 is journaled at each side, and these rollers protrude sufficiently to bear on the inner faces of the side-bars 20, relieving the slidably-supported front end of the brake reach-bar of considerable friction.

Forwardly of the brake-shaft 14 is secured to the hounds 11, by straps 23, a crossbar 24, the latter having a groove in its upper face which serves as a bearing for a U-shaped hanger 25, the arms of the hanger being suitably attached to a brake-beam 26, carrying the brake-shoes 27, arranged to bear on the rear wheels at the inside of the rear axle. The brake-beam 26 is fulcrumed centrally to a clevis 28 by a bolt 29, the bolt having a lever-operated nut 30, so that it can be conveniently loosened and tightened, and is adapted to pass through any set of alining openings along the length of the clevis, as indicated at 31, in Figs. 1 and 3. To the rear end of the clevis is centrally fulcrumed a lever 32, and each end of this lever is operatively connected to one of the arms 16 by a link 34, a number of openings being formed in the arms 16 for the adjustability of these links, whereby leverage of the brake is increased or diminished, as desired. By this arrangement it is obvious that the clevis and lever afford an evener for the brake-beam, adapting the shoes to be applied to the wheels with uniform pressure. The adjustment of the clevis by the bolt 29 permits of the brake shoes being moved closer to the wheels to compensate for wear.

The king pin 8 passes through and fastens to the front axle, a brace 35, the latter being secured at its inner end to the under side of the reach-bar 7, by bolts or other suitable devices, one of the bolts being shown to pass through a hanger 36, serving to attach the forward end of a spring 37, which is connected at its opposite end to the brake reach-bar and tends to force the brakes to a released position. A tongue 38 has a fork at its inner end, in which is journaled a vertical roller 39, bearing against the roller 21, the latter being convex, as shown in Fig. 3, and the roller 39 concave, as illustrated in Figs. 1 and 2, so that the brake reach-bar will not be actuated by the lateral or vertical movement of the tongue, the latter, as best shown in Fig. 3, being slidable between tongue hounds 40, each of which is fulcrumed at its inner end to swing vertically, to straps 41, the straps being secured about the axle by U-shaped clamps 42. The tongue is retained between the hounds 40 by crossplates 43 and 44, the plates being secured to the upper and under faces of the hounds, with the upper front plate 43 having a forwardly-extended spring catch 45 arranged over the tongue and provided with a shoulder 46, with which a pawl 47 is adapted to engage, the pawl 47 being pivotally supported at its upper end on a locking-lever 48 having a downwardly-turned flange or toe 49 at its rear end, and fulcrumed intermediate its length between upwardly-extended ears 50 carried by the plate 43, the lever, as shown in Figs. 1 and 2, having depending ears 51, through which the pivot-pin of the lever passes. A spring 52 arranged on this pin tends to swing the forward end of the lever downwardly and raise the flange or toe 49 over a roller 53 journaled in a suitable bracket carried by the tongue. With the pawl engaged with the shoulder 46 of the spring catch 45, the brake will be automatically locked when both applied and released, as shown in Figs. 1 and 2. Thus, with the brake released, as shown in Fig. 1, when the tongue is backed or forced rearwardly with sufficient force, as when the draft animals are going down hill with a heavy load, the roller 53 will be forced under the toe 49 and pass to the position shown in Fig. 2, in which the toe engages at the front of the roller, this movement of the roller being possible by reason of the depression of the spring catch 45 through the locking lever and pawl 47. The brake will be locked in this position until a sufficient pull is exerted on the tongue to again draw the roller under the toe 49, when the brakes will be locked in a released position, as shown in Fig. 1, this releasing of the locking means so that the tongue can be moved back and forth, being accomplished by uniform strains on account of the roller 53. When the pawl 47 is disengaged from the shoulder 46, the tongue can freely move back and forth and apply and release the brake without locking it in either position.

For manually releasing and engaging the pawl 47 it is operatively connected to a bar 54 by a screw-eye 55, the screw-eye being adapted to be threaded in a recess directly over the pivot of the pawl or in a recess, shown in dotted outline in Fig. 2, directly at the rear of the pivot. To the outer end of the bar 54 is attached a flexible line 56, which when pulled, when the screw-eye is in the rear recess, re-engages the pawl with the spring catch. The line if pulled and quickly released with the screw-eye thus positioned, disengages the pawl from the spring catch. When the screw-eye is in the forward recess of the pawl, the pawl is engaged with the spring catch by pulling the line upwardly and forwardly, and disengaged by pulling the line upwardly and rearwardly, and then relaxing the line. In this case, if the driver is seated on the top of a very high load it would be necessary to reach out forwardly an inconvenient distance to lock the brake, and for this reason the two connections for the screw-eye are provided, thus making the lock so that it can be operated effectively under all conditions. In Fig. 3 I have shown a ring 57 in the length of the line for engaging the finger in operating the pawl; also, in Figs. 3 and 4, a sheave clamp, about which the line may be passed and which may be applied to any convenient part of the forward portion of the wagon so that the lock may be operated from the driver's seat. This clamp, as shown, is provided with clamping jaws 58, having an adjusting screw 59, with a fixed jaw extended under the slidable jaw and carrying the sheave 60, about which the line passes, the latter having a hook or other convenient operating member 61.

The brake, as shown, is designed to be used without the hounds between the reach-bar and the front axle. However, this is not essential, and if desired any suitable form of hound may be used, or the chains 62, as shown. Should the chains 62 be used, they are made sufficiently slack to allow the front axle to turn relatively to the reach.

I preferably provide a casing 62ª to cover the locking mechanism and protect it from the dirt, weather, etc., the casing having laterally-extending arms at each side which are notched at the ends to engage turn-bolts 63, the casing being further provided with a slot 64 in the top, through which the operating bar 54 extends.

Having thus described my invention, I claim as new and desire to secure by Letters Patent:

1. The combination of a vehicle having a tongue, a braking mechanism constructed and arranged to be applied and released under the action of the tongue, means to automatically lock the brakes when both applied and released, and means to throw the locking means out of action.

2. The combination of a vehicle having a draft member, a braking mechanism constructed and arranged to be applied and released under the action of the draft member, and means to automatically lock the draft member with the brake in either an applied or released position, adapted to be automatically overcome by a predetermined strain.

3. The combination of a vehicle having a tongue, a braking mechanism constructed and arranged to be applied and released under the action of the tongue, and means to automatically lock the brakes when both applied and released, having a pawl for throwing it into and out of operation.

4. The combination of a vehicle having a draft member, a braking mechanism constructed and arranged to be applied and released under the action of the draft member, a yielding locking lever carried by the vehicle, and a roller carried by the draft member and arranged to engage the locking lever and to be forced to either side thereof and lock the brakes both when applied and released.

5. The combination of a vehicle having a tongue-operated brake, and a locking mechanism to automatically lock the brake when both applied and released, having a displaceable member to throw it into and out of action.

6. The combination of a vehicle having a reciprocating tongue, a braking mechanism constructed and arranged to be applied and released under the action of the tongue, a locking lever fulcrumed intermediate its length and carried independently of the reciprocatory movement of the tongue, a spring catch carried independently of the reciprocatory movement of the tongue, a pawl carried by the lever and adapted to engage the spring catch, and a roller carried by the tongue and arranged to be forced under the lever against the action of the spring catch and lock the brakes both applied and released.

7. The combination of a vehicle having a tongue, a braking mechanism constructed and arranged to be applied and released under the action of the tongue, a locking mechanism to secure the tongue with the brakes both applied and released, automatically operated and having a releasable member arranged to throw it into and out of action, an operating bar connected to said member, and an operating line connected to the bar.

8. The combination of a vehicle having tongue hounds and provided with a tongue slidably retained between the hounds, a brake mechanism operated by the sliding movement of the tongue, and a locking mechanism carried by the tongue and hounds, constructed to automatically secure the tongue against movement under a strain within certain limits when the brakes are both applied and released.

9. The combination of a vehicle having tongue hounds and provided with a tongue slidably retained between the hounds, a braking mechanism arranged and constructed to be actuated by the sliding movement of the tongue, a locking lever fulcrumed intermediate its length and carried by the hounds, having a downwardly-projecting toe at its rear end, a spring catch carried by the hounds, a pawl fulcrumed to the forward end of the locking lever and arranged to engage with the spring catch, and a roller carried by the tongue and arranged in the path of the toe of the locking lever and operating in connection therewith to lock the tongue in both its inner and outer positions.

10. The combination of a vehicle having tongue hounds and provided with a tongue slidably retained between the hounds, a braking mechanism arranged and constructed to be actuated by the sliding movement of the tongue, a locking lever fulcrumed intermediate its length and carried by the hounds, having a downwardly-projecting toe at its rear end, a spring catch carried by the hounds, a pawl fulcrumed on the forward end of the locking lever and arranged to engage with the spring catch, a roller carried by the tongue and arranged in the path of the toe of the locking lever and operating in connection therewith to lock the tongue in both its inner and outer positions, and a spring forcing the locking lever in a direction to retain the pawl in engagement with the spring catch.

11. The combination of a wagon having tongue hounds and provided with a tongue slidably retained between the hounds, a braking mechanism arranged and constructed to be operated by the sliding movement of the tongue, a spring catch carried by the hounds, means to automatically lock the tongue in both its forward and retracted positions, having a pawl arranged to engage with the spring catch, and an operating member having means for securing it to the pawl at varying distances from its pivot.

12. The combination of a vehicle having a reach-bar, a brake-beam, a cross-bar carried by the reach-bar, a U-shaped hanger supporting the brake-beam and journaled on the cross-bar, a brake shaft extending transversely of the reach-bar and having depending arms, a clevis fulcrumed centrally of the brake-beam and having an equalizing lever, and links connecting the opposite ends of the lever to the respective arms of the brake shaft.

13. The combination of a vehicle having a reach-bar, a brake-beam, a hanger pivotally supporting the brake-beam from the reach-bar, a brake shaft supported transversely of the reach-bar and having depending arms, a clevis connected centrally of the brake-beam and having an equalizing lever, and links operatively connecting the ends of the lever to the respective arms of the brake shaft.

14. The combination of a wagon having a reach-bar, a brake-beam having a hanger pivotally supported on the reach-bar, a brake shaft arranged crosswise of the reach-bar and provided with downwardly-extended arms, a brake reach bar slidably supported on the front axle of the wagon and adjustably connected to the arms, a clevis adjustably connected centrally of the brake-beam and having an equalizing lever, and links connected to the opposite ends of the lever and adjustably connected to the respective arms of the brake shaft.

In testimony whereof I have signed my name to this specification in the presence of two subscribing witnesses.

EBEN G. DOLAND.

Witnesses:
 FRED F. HILL,
 VERNE W. ELLISON.